(12) United States Patent
Dong et al.

(10) Patent No.: US 12,363,652 B2
(45) Date of Patent: Jul. 15, 2025

(54) SYSTEM AND METHOD FOR POWER HEADROOM REPORTING

(71) Applicant: ZTE CORPORATION, Guangdong (CN)

(72) Inventors: Fei Dong, Shenzhen (CN); He Huang, Shenzhen (CN); Mengjie Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/876,928

(22) Filed: Jul. 29, 2022

(65) Prior Publication Data

US 2023/0018421 A1   Jan. 19, 2023

Related U.S. Application Data

(63) Continuation of application No. PCT/CN2020/083958, filed on Apr. 9, 2020.

(51) Int. Cl.
| | |
|---|---|
| *H04W 52/36* | (2009.01) |
| *H04W 36/00* | (2009.01) |
| *H04W 36/18* | (2009.01) |
| *H04W 52/40* | (2009.01) |
| *H04W 74/0833* | (2024.01) |

(52) U.S. Cl.
CPC ........... *H04W 52/40* (2013.01); *H04W 36/13* (2023.05); *H04W 36/185* (2023.05); *H04W 52/365* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2010/0238830 A1 | 9/2010 | Kim et al. | |
| 2013/0301568 A1 | 11/2013 | Park et al. | |
| 2015/0223124 A1* | 8/2015 | Wang | H04W 24/08 455/436 |
| 2016/0037463 A1 | 2/2016 | Siomina | |
| 2016/0192254 A1* | 6/2016 | Hooli | H04W 36/0069 370/331 |

(Continued)

FOREIGN PATENT DOCUMENTS

| | | |
|---|---|---|
| CN | 109479247 A | 3/2019 |
| CN | 105264850 B | 5/2019 |

(Continued)

OTHER PUBLICATIONS

International Search Report and Written Opinion for PCT Appl. No. PCT/CN2020/083958 dated Dec. 28, 2020 (7 pages).

(Continued)

*Primary Examiner* — Benjamin Lamont
(74) *Attorney, Agent, or Firm* — Foley & Lardner LLP

(57) ABSTRACT

A system and method for power headroom reporting (PHR) during a Dual Activity Protocol Structure (DAPS) handover procedure. The system and method include receiving, by a wireless communication device, a handover command to begin a dual activity protocol structure (DAPS) handover; detecting, by the wireless communication device during the DAPS handover, a condition for power headroom reporting (PHR); and performing, by the wireless communication device during the DAPS handover, the PHR.

16 Claims, 9 Drawing Sheets

(56) References Cited

U.S. PATENT DOCUMENTS

| | | | |
|---|---|---|---|
| 2017/0303213 | A1 | 10/2017 | Park et al. |
| 2017/0311206 | A1 | 10/2017 | Ryoo et al. |
| 2017/0347326 | A1 | 11/2017 | Dinan |
| 2018/0324715 | A1* | 11/2018 | Ryoo .................. H04W 52/365 |
| 2019/0053170 | A1* | 2/2019 | Lee ....................... H04W 72/23 |
| 2019/0174346 | A1* | 6/2019 | Murray ................. H04B 7/0408 |
| 2019/0239171 | A1* | 8/2019 | Ahn ....................... H04W 72/23 |
| 2019/0349822 | A1 | 11/2019 | Kim et al. |
| 2019/0394732 | A1 | 12/2019 | Loehr et al. |
| 2020/0022094 | A1 | 1/2020 | You et al. |
| 2020/0107272 | A1* | 4/2020 | He ...................... H04W 52/325 |
| 2020/0288412 | A1* | 9/2020 | Ajdakple ............ H04W 52/242 |
| 2021/0068061 | A1* | 3/2021 | Zhao .......................... H04L 5/00 |
| 2021/0084546 | A1* | 3/2021 | Awoniyi-Oteri .............................. H04W 36/0061 |

FOREIGN PATENT DOCUMENTS

| | | |
|---|---|---|
| CN | 110583053 A | 12/2019 |
| WO | WO-2019/099634 A1 | 5/2019 |

OTHER PUBLICATIONS

ZTE Corporation et al.: "Remaining issues on UE capability coordination for DAPS HO" 3GPP TSG RAN WG2 Meeting #109e; R2-2001261; Online, Mar. 6, 2020 (3 pages).

3GPP TS 36.321; Technical Specification Group Radio Access Network; Evolved Universal Terrestrial Radio Access (E-UTRA); Medium Access Control (MAC) protocol specification (Release 16); V16.0.0; Mar. 2020 (141 pages).

3GPP TS 38.321; Technical Specification Group Radio Access Network; NR; Medium Access Control (MAC) protocol specification (Release 16); V16.0.0; Mar. 2020 (141 pages).

Ericsson, "Analysis of PHR and msg3," 3GPP TSG-RAN WG2 #102; Tdoc R2-1807033; May 21-25, 2018; Busan, Republic of Korea (7 pages).

Extended European Search Report on EP 20896695.2 dated Aug. 7, 2023 (12 pages).

Intel Corporation, "Report of [AT109e][211][MOB] UE capabilities for DAPS and CHO (Intel)," 3GPP TSG-RAN WG2 Meeting #109 electronic; R2-2001727; Feb. 24-Mar. 6, 2020; Elbonia (174 pages).

First Office Action for CN Appl. No. 202080097748.1, dated Jun. 27, 2024 (with English translation, 21 pages).

Decision of Rejection for CN App. No. 202080097748.1 dated Apr. 29, 2025, received May 29, 2025 (with English translation, 24 pages).

\* cited by examiner

500C

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of the other MAC entity) ||||||
| R | R | $P_{CMAX,c}$ 1 ||||||
| P | V | PH(type 1, source cell) ||||||
| R | R | $P_{CMAX,c}$ 2 ||||||
| P | V | PH(type 1, target cell) ||||||
| R | R | $P_{CMAX,c}$ 3 ||||||

...

| P | V | PH (Type X, Serving Cell n) ||||||
| R | R | $P_{CMAX,c}$ m ||||||

| $C_7$ | $C_6$ | $C_5$ | $C_4$ | $C_3$ | $C_2$ | $C_1$ | R |
|---|---|---|---|---|---|---|---|
| P | V | PH (Type 2, SpCell of the other MAC entity) ||||||
| R | R | $P_{CMAX,c}$ 1 ||||||
| P | V | PH(type 1, source cell) ||||||
| R | R | $P_{CMAX,c}$ 2 ||||||
| P | V | PH(type 1, target cell) ||||||
| R | R | $P_{CMAX,c}$ 3 ||||||

...

| P | V | PH (Type X, Serving Cell n) |
|---|---|---|
| R | R | $P_{CMAX,c}$ m |

FIG. 5D

SYSTEM AND METHOD FOR POWER HEADROOM REPORTING

CROSS-REFERENCE TO RELATED APPLICATION

This application claims the benefit of priority under 35 U.S.C. § 120 as a continuation of PCT Patent Application No. PCT/CN2020/083958, filed on Apr. 9, 2020, the disclosure of which is incorporated herein by reference in its entirety.

TECHNICAL FIELD

The disclosure relates generally to wireless communications and, more particularly, to systems and methods for power headroom reporting (PHR) during a Dual Activity Protocol Structure (DAPS) handover procedure.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

One aspect disclosed herein is directed to a method for power headroom reporting (PHR) during a Dual Activity Protocol Structure (DAPS) handover procedure. In some embodiments, the method includes receiving, by a wireless communication device (e.g., UE 304 in FIG. 3), a handover command to begin a dual activity protocol structure (DAPS) handover. In some embodiments, the method includes detecting, by the wireless communication device during the DAPS handover, a condition for power headroom reporting (PHR). In some embodiments, the method includes performing, by the wireless communication device during the DAPS handover, the PHR.

In some embodiments, the condition indicates a successful termination of a random access channel (RACH) procedure in a target cell associated with the DAPS handover.

In some embodiments, the condition indicates a triggering of the DAPS handover, an activation of the DAPS handover, or a configuration of the DAPS handover.

In some embodiments, the condition indicates an addition of at least one of a target secondary cell (SCell) or a target primary cell (PCell).

In some embodiments, the condition indicates an initiation of a random access channel (RACH) procedure in a target cell during the DAPS handover or a transmission of a preamble during the DAPS handover.

In some embodiments, the method includes determining, by the wireless communication device, at least one PHR is triggered in one MAC entity. In some embodiments, the method includes determining, by the wireless communication device, that a PHR MAC CE format may be used for reporting PHR based on an information element configured from the wireless communication node.

In some embodiments, the PHR MAC CE format includes a multiple entry PHR MAC CE and/or a single entry MAC CE. In some embodiments, the multiple entry PHR MAC CE includes the power headroom information of one or more serving cells. In some embodiments, the single entry PHR MAC CE includes the power headroom information of a specific serving cell.

In some embodiments, the information element may be configured into at least one of the following signaling: a handover command, a handover request acknowledgement, and a CellGroupConfig that is associated with a source MAC entity.

In some embodiments, in the case of the information element being included in a handover command, the information element may indicate that the multiple entry MAC CE or single entry PHR MAC CE may be used. In some embodiments, the method includes determining, by the wireless communication device, to: select a multiple entry MAC CE or single entry PHR MAC CE for sending to a source node, select the multiple entry MAC CE or single entry PHR MAC CE for sending to a target node, or select a multiple entry MAC CE or single entry PHR MAC CE for sending to either the source node or the target node.

In some embodiments, in the case of the information element being included in the handover request acknowledgement, the information element may indicate that the multiple entry MAC CE may be used. In some embodiments, the method includes determining, by the wireless communication device, to: select the multiple entry MAC CE for sending to a source node, select the multiple entry MAC CE for sending to a target node, or select multiple entry MAC CE for sending to either the source node or the target node.

In some embodiments, in the case of the information element being included in the handover request acknowledgement, the information element may indicate that the single entry PHR MAC CE may be used. In some embodiments, the method includes determining, by the wireless communication device, to: select the single entry PHR MAC CE for sending to a source node, select the single entry PHR MAC CE for sending to a target node, or select single entry PHR MAC CE for sending to either the source node or the target node.

In some embodiments, in the case of the information element being included in CG-configuration corresponding to the source MAC entity, the information element may indicate that the multiple entry may be used. In some embodiments, the method includes determining, by the wireless communication device, to select the multiple entry MAC CE for sending to a source node.

In some embodiments, in the case of the information element being included in CG-configuration corresponding to the source MAC entity, the information element may indicate that the single entry PHR MAC CE may be used. In some embodiments, the method includes determining, by the wireless communication device, to select the single entry PHR MAC CE for sending to a source node.

In some embodiments, the method includes determining, by the wireless communication device, a data radio bearer (DRB) is configured with a DAPS configuration. In some embodiments, the method includes determining, by the wireless communication device and responsive to determining the at least one of the DRBs is configured with the DAPS configuration, a multiple entry PHR MAC CE format may be selected for reporting the PHR to a source cell during the DAPS handover.

In some embodiments, the method includes determining, by the wireless communication device, a capability of the wireless communication device for dynamic power sharing. In some embodiments, the method includes determining, by the wireless communication device and responsive to determining the capability, a multiple entry PHR MAC CE format for reporting the PHR to a source cell during the DAPS handover.

In some embodiments, the method includes determining, by the wireless communication device, a value type of PHR information associated with source cells or target cells in PHR MAC CE.

In some embodiments, the handover command includes an information element indicating a PHR mode (e.g., phr-ModeOtherCG), and the method includes determining, by the wireless communication device and based on the phr-ModeOtherCG. In some embodiments, if multiple PHR MAC CE is triggered and there is an available PUSCH resources on target cells can accommodate the multiple PHR MAC CE and if the phr-ModeotherCG is set to real in the case there is an UL transmission on a source cell, the target MAC entity shall obtain the value of maximum UL power from physical layer for the serving cell.

In some embodiments, the RRC configuration associated to a source MAC entity includes an information element (e.g., phr-ModeotherCG), and the method includes determining, by the wireless communication device and based on the phr-ModeotherCG. In some embodiments, if a multiple PHR MAC CE is triggered and there is at least one available PUSCH resource on the source cells that can accommodate the multiple PHR MAC CE and if the phr-ModeotherCG is set to real, in the case there is an UL transmission on a target cell, then the source MAC entity may obtain the value of maximum UL power from physical layer for the serving cell.

In some embodiments, the method includes receiving, by the wireless communication device from a wireless communication node and prior to receiving the handover command to begin the DAPS handover, an information element indicating a PHR mode associated with a source cell in a multiple entry MAC CE. In some embodiments, if a multiple PHR MAC CE is triggered and there is an available PUSCH resources on target cells can accommodate the multiple PHR MAC CE and if the phr-ModeotherCG is set to real in the case there is an UL transmission on a source cell, the target MAC entity shall obtain the value of maximum UL power from physical layer for the serving cell.

In some embodiments, the method includes determining, by the wireless communication device, that a multiple entry MAC CE is triggered during DAPS handover. In some embodiments, if there is an available PUSCH resource on the target cells that can accommodate the multiple PHR MAC CE and there is an UL transmission on a source cell, then the target MAC entity may obtain the value of maximum UL power from physical layer for the serving cell.

In some embodiments, the method includes determining, by the wireless communication device, a multiple entry MAC CE is triggered during DAPS handover. In some embodiments, if there is an available PUSCH resources on the source cells that can accommodate the multiple PHR MAC CE and there is an UL transmission on a target cell, then the source MAC entity shall obtain the value of maximum UL power from physical layer for the target cell.

In some embodiments, the method includes determining, by the wireless communication devices, a multiple entry PHR MAC CE format for reporting the PHR. In some embodiments, the method includes determining, by the wireless communication device, a procedure for reporting PHR information of a target cell and a source cell in a multiple PHR MAC CE during the DAPS handover.

In some embodiments, the method includes receiving, by the wireless communication device, a radio resource control (RRC) signaling including a virtual serving cell identifier (ID) for the target cell. In some embodiments, the method includes determining, by the wireless communication device, to report the PHR information of the target cell associated with the virtual serving cell ID to a source cell.

In some embodiments, the method includes receiving, by the wireless communication device, a radio resource control (RRC) signaling including a virtual serving cell identifier (ID) for the source cell. In some embodiments, the method includes determining, by the wireless communication device, to report the PHR information of the source cell associated with the virtual serving cell ID to a target cell.

In some embodiments, a fixed virtual serving cell ID is defined for representing the target cell or to the source cell in the multiple entry PHR MAC CE during the DAPS handover.

In some embodiments, the method includes determining, by the wireless communication device, a special multiple entry PHR MAC CE format used for the procedure of DAPS handover.

In some embodiments, the special multiple entry PHR MAC CE format includes at least one a PHR information of a target serving cell, a PHR information of source serving cell, a PHR information of a primary cell (PCell) information, and a serving cell identifier (ID).

In some embodiments, the special multiple entry PHR MAC CE during the DAPS handover procedure may have a different logical channel ID (LCID) with a multiple entry PHR MAC CE not used during the DAPS handover procedure. In some embodiments, the special multiple entry MAC CE during DAPS handover procedure can be identified from one bit indication within the multiple entry MAC CE not used during the DAPS handover procedure.

In some embodiments, the method includes determining, by the wireless communication device, a multiple entry MAC CE is triggered. In some embodiments, the method includes generating, by target and source MAC entity of the wireless communication device, a respective multiple entry PHR MAC CE comprising PH information of the activated serving cells those are associated with the respective MAC entity.

In some embodiments, the method includes determining, by the wireless communication device, that a MAC entity of the wireless communication device generated and transmitted a multiple entry PHR MAC CE. In some embodiments, the method includes canceling, by the wireless communication device, the PHR(s) triggered by the MAC entity.

In some embodiments, the method includes determining, by the wireless communication device, that a MAC entity of the wireless communication device generated and transmitted a multiple entry PHR MAC CE. In some embodiments, the method includes canceling, by the wireless communication device, all PHRs that are triggered for any MAC entities.

In some embodiments, the method includes determining, by wireless communication device, a PHR is triggered and a PHR format of the information in the PHR corresponds to a single entry PHR medium access control (MAC) control element (CE), and the method includes generating, by a first MAC entity of the wireless communication device that is associated with a target cell, a first single entry PHR MAC CE comprising information in the PHR that is associated with a primary cell of the first MAC entity. In some embodiments, the method includes generating, by a second MAC entity of the wireless communication device that is associated with a source cell, a second single entry PHR MAC CE comprising information in the PHR that is associated with a primary cell of the second MAC entity.

In some embodiments, the method includes determining, by wireless communication device, a PHR is triggered and a PHR format of the information in the PHR corresponds to a single entry PHR medium access control (MAC) control element (CE), and the method includes generating, by a first MAC entity of the wireless communication device that is associated with a target cell, a first single entry PHR MAC CE comprising information in the PHR that is associated with the target cell. In some embodiments, the method includes generating, by a second MAC entity of the wireless communication device that is associated with a source cell, a second single entry PHR MAC CE comprising information in the PHR that is associated with the target cell.

In some embodiments, a PHR format of the information in the PHR corresponds to a single entry PHR medium access control (MAC) control element (CE), and the method includes generating, by a first MAC entity of the wireless communication device that is associated with a target cell, a first single entry PHR MAC CE comprising information in the PHR that is associated with a source cell. In some embodiments, the method includes generating, by a second MAC entity of the wireless communication device that is associated with a source cell, a second single entry PHR MAC CE comprising information in the PHR that is associated with the source cell.

In some embodiments, receiving from the second wireless communication node, by the first wireless communication node, the information element The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 5C illustrates a block diagram of an example special multiple PHR MAC CE format during DAPS HO, in accordance with some embodiments of the present disclosure.

FIG. 5D illustrates a block diagram of an example special multiple entry MAC CE format which has a different LCID with the legacy multiple entry MAC CE, in accordance with some embodiments of the present disclosure.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:
  3GPP 3rd Generation Partnership Project
  5G 5th Generation Mobile Networks
  5G-AN 5G Access Network
  5G gNB Next Generation NodeB
  BS Base Station
  CG Cell Group
  DAPS Dual Activity Protocol Structure
  DL Down Link or Downlink
  HO Handover
  MAC Media Access Control
  NR Next Generation RAN PHR Power Headroom Report or Power Headroom Reporting
RAN Radio Access Network
RLC Radio Link Control
RRC Radio Resource Control
UE User Equipment
UL Up Link or Uplink A Dual Activity Protocol (DAPS) handover allows a UE (e.g., UE 304 in FIG. 3) to maintain (e.g., retain, preserve, hold, etc.) two connection paths simultaneously during handover procedure until the notification from a target cell is received by a source cell in order to guarantee that the buffer data is not lost during the handover (HO) period.

Figure 1:
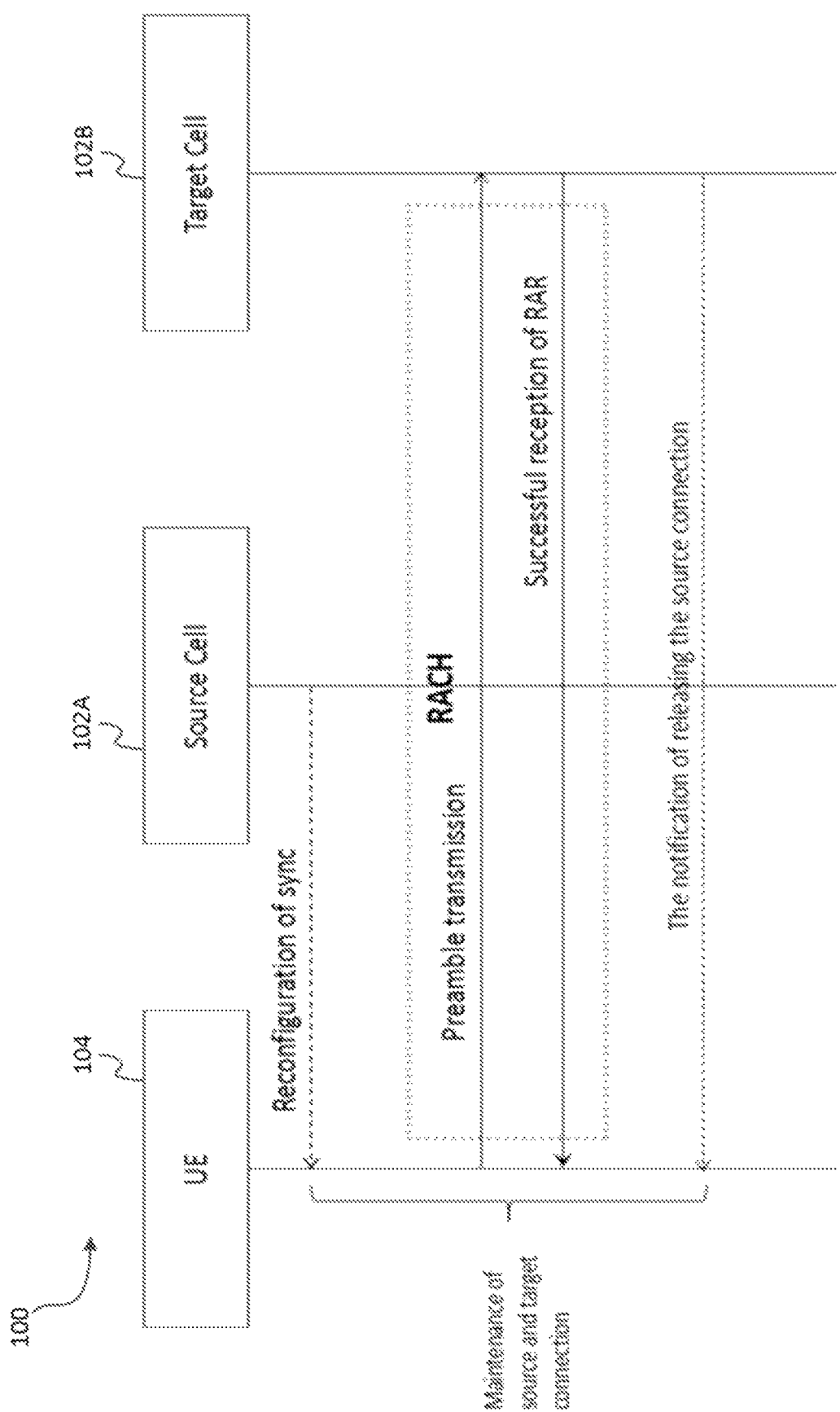
FIG. 1 illustrates a flow diagram of an example environment of a 5G system for performing a Dual Activity Protocol Structure (DAPS) handover, in accordance with some embodiments of the present disclosure.

For example, FIG. 1 illustrates a flow diagram of an example environment of a 5G system for performing a Dual Activity Protocol Structure (DAPS) handover, in accordance with some embodiments of the present disclosure. The example environment 100 includes a UE 104 (e.g., UE 304 in FIG. 3), a source cell 102A (sometimes referred to as, "wireless communication node"), and/or a target cell 102B (sometimes referred to as, "wireless communication node"). In some embodiments, the source cell 102A may be a "first" wireless communication node having identical or similar functionality as the BS 302 in FIG. 3 and the target cell 102B may be a "second" wireless communication node having identical or similar functionality as the BS 302 in FIG. 3.

The source cell 102A may send a message (labeled in FIG. 1 as, "Reconfiguration of sync") to the UE 104 to cause the UE 104 to execute a handover procedure. In some embodiments, the message can be called a handover command. In response to executing the handover procedure, the UE 104 may send a preamble transmission to the target node 102B. The target node 102B may send a message (labeled in FIG. 1 as, "Successful reception of RAR") indicating a successful reception of a random access response (RAR). The target node 102B may send a message (labeled in FIG. 1 as, "The notification of releasing the source connection") indicating that the target node 102B successfully released the source connection to the UE 104.

Therefore, during the handover period, the UE 104 may have two primary cells (PCells), where one primary cell is from the target node (e.g., cell groups associated with target node 102B) and the other primary cell is from the source node (e.g., cell groups associated with target node 102B).

Figure 2:
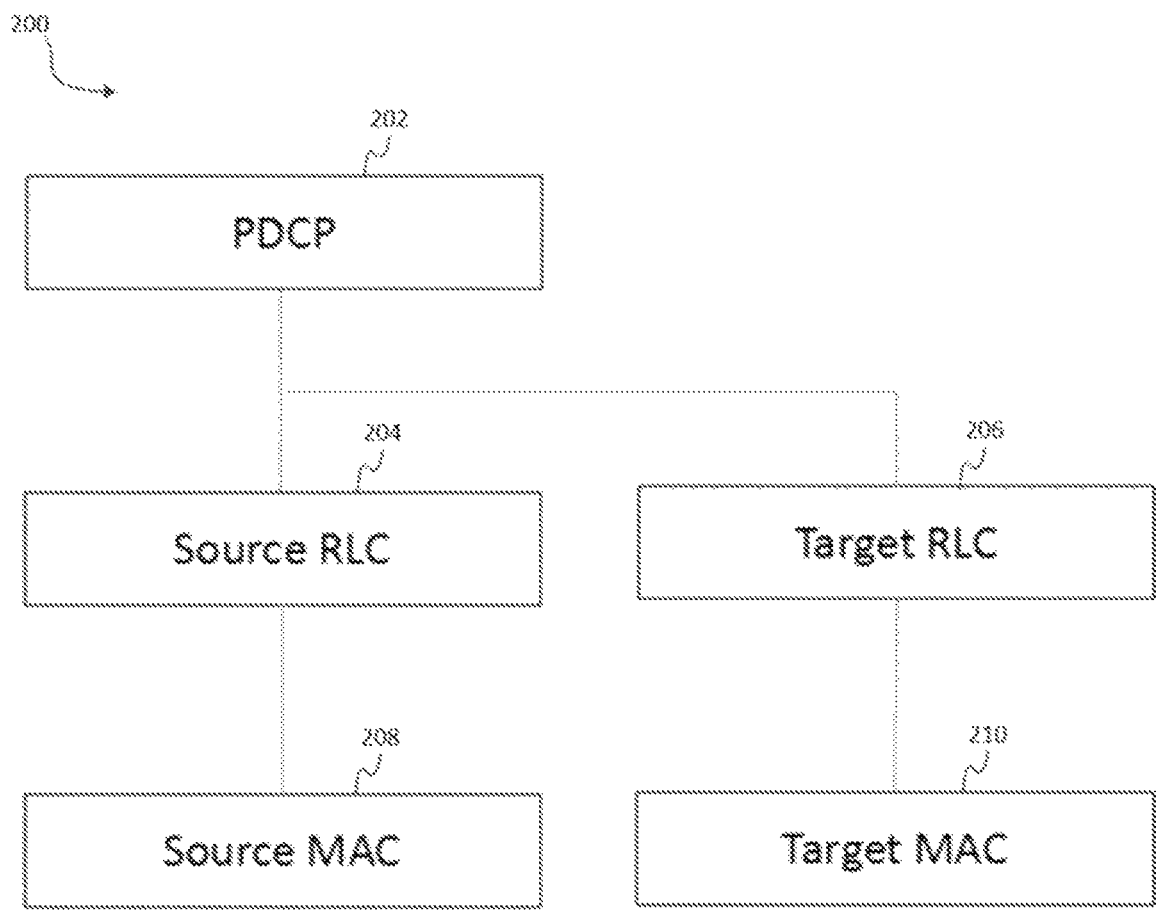
FIG. 2 illustrates a block diagram of an example Dual Activity Protocol (DAPS) stack, in accordance with some embodiments of the present disclosure.

For example, FIG. 2 illustrates a block diagram of an example Dual Activity Protocol (DAPS) stack, in accordance with some embodiments of the present disclosure. As shown, a packet data convergence protocol (PDCP) 202 exists within a UE (e.g., UE 304 in FIG. 3) and/or a BS (e.g., BS 302 in FIG. 3) and provides services and/or functions such as the transfer of control plane data. The PDCP 202 supports a source radio link control (RLC) 204 and a target RLC 206. The source RLC supports a source media access control (MAC) 208 and the target RLC 206 supports a target MAC 210.

Since a network (e.g., BS 302 in FIG. 3) expects for the UE to perform the power headroom (PHR) procedure for primary cells, the UE should perform a PHR procedure for the target cell group and the source cell group during the handover period.

Conventional 5G systems, however, are designed to perform a PHR procedure for only one primary cell (sometimes referred to as, "a PCell structure"), and not multiple primary cells.

Accordingly, the present disclosure is directed to systems and methods for power headroom reporting during a DAPS handover procedure.

1. Mobile Communication Technology and Environment

Figure 3:
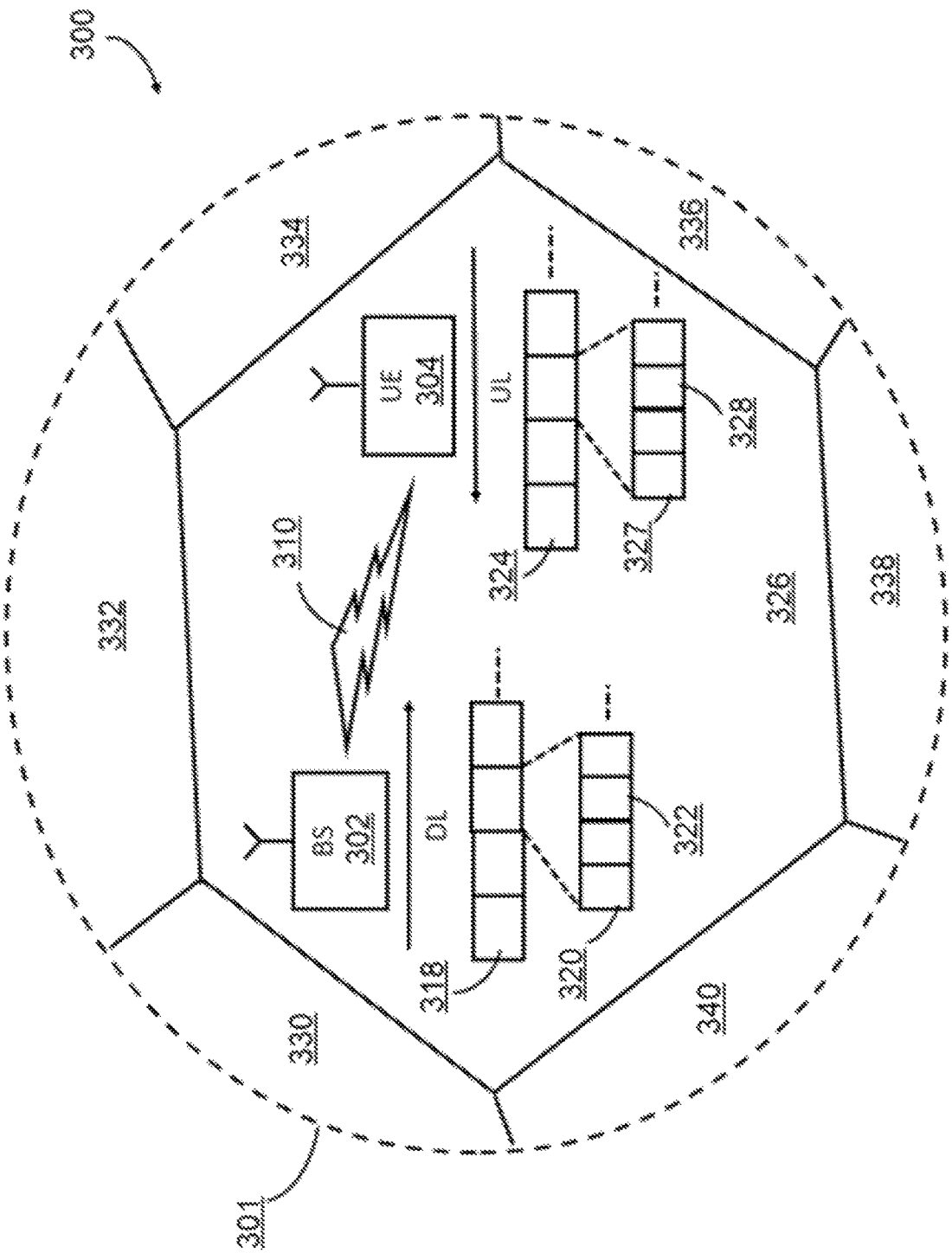
FIG. 3 illustrates an example wireless communication network, and/or system, 300 in which techniques disclosed herein may be implemented, in accordance with an embodiment of the present disclosure.

FIG. 3 illustrates an example wireless communication network, and/or system, 300 in which techniques disclosed herein may be implemented, in accordance with an embodiment of the present disclosure. In the following discussion, the wireless communication network 300 may be any wireless network, such as a cellular network or a narrowband Internet of things (NB-IoT) network, and is herein referred to as "network 300." Such an example network 300 includes a base station 302 (hereinafter "BS 302"; also referred to as wireless communication node) and a user equipment device 304 (hereinafter "UE 304"; also referred to as wireless communication device) that can communicate with each other via a communication link 310 (e.g., a wireless communication channel), and a cluster of cells 326, 330, 332, 334, 336, 338 and 340 overlaying a geographical area 301. In FIG. 3, the BS 302 and UE 304 are contained within a respective geographic boundary of cell 326. Each of the other cells 330, 332, 334, 336, 338 and 340 may include at least one base station operating at its allocated bandwidth to provide adequate radio coverage to its intended users.

For example, the BS 302 may operate at an allocated channel transmission bandwidth to provide adequate coverage to the UE 304. The BS 302 and the UE 304 may communicate via a downlink radio frame 318, and an uplink radio frame 324 respectively. Each radio frame 318/324 may be further divided into sub-frames 320/327 which may include data symbols 322/328. In the present disclosure, the BS 302 and UE 304 are described herein as non-limiting examples of "communication nodes," generally, which can practice the methods disclosed herein. Such communication nodes may be capable of wireless and/or wired communications, in accordance with various embodiments of the present solution.

Figure 4:
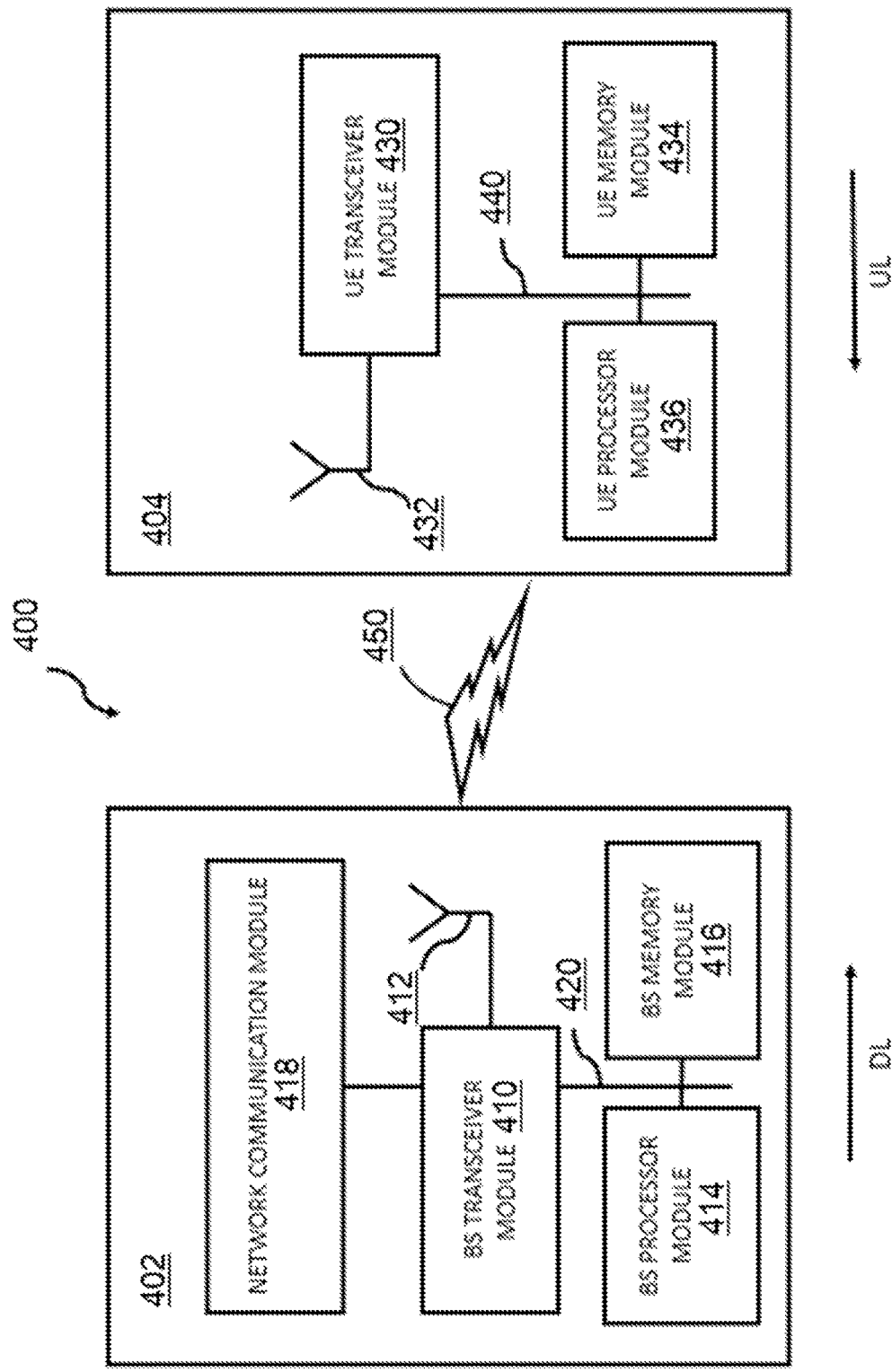
FIG. 4 illustrates a block diagram of an example wireless communication system 400 for transmitting and receiving wireless communication signals (e.g., OFDM/OFDMA signals) in accordance with some embodiments of the present disclosure.

FIG. 4 illustrates a block diagram of an example wireless communication system 400 for transmitting and receiving wireless communication signals (e.g., OFDM/OFDMA signals) in accordance with some embodiments of the present disclosure. The system 400 may include components and elements configured to support known or conventional operating features that need not be described in detail herein. In one illustrative embodiment, system 400 can be used to communicate (e.g., transmit and receive) data symbols in a wireless communication environment such as the wireless communication environment 300 of FIG. 3, as described above.

System 400 generally includes a base station 402 (hereinafter "BS 402") and a user equipment device 404 (hereinafter "UE 404"). The BS 402 includes a BS (base station) transceiver module 410, a BS antenna 412, a BS processor module 414, a BS memory module 416, and a network communication module 418, each module being coupled and interconnected with one another as necessary via a data communication bus 420. The UE 404 includes a UE (user equipment) transceiver module 430, a UE antenna 432, a UE memory module 434, and a UE processor module 436, each module being coupled and interconnected with one another as necessary via a data communication bus 440. The BS 402 communicates with the UE 404 via a communication channel 450, which can be any wireless channel or other medium suitable for transmission of data as described herein.

As would be understood by persons of ordinary skill in the art, system 400 may further include any number of modules other than the modules shown in FIG. 4. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 430 may be referred to herein as an "uplink" transceiver 430 that includes a radio frequency (RF) transmitter and a RF receiver each comprising circuitry that is coupled to the antenna 432. A duplex switch (not shown) may alternatively couple the uplink transmitter or receiver to the uplink antenna in time duplex fashion. Similarly, in accordance with some embodiments, the BS transceiver 410 may be referred to herein as a "downlink" transceiver 410 that includes a RF transmitter and a RF receiver each comprising circuitry that is coupled to the antenna 412. A downlink duplex switch may alternatively couple the downlink transmitter or receiver to the downlink antenna 212 in time duplex fashion. The operations of the two transceiver modules 410 and 430 may be coordinated in time such that the uplink receiver circuitry is coupled to the uplink antenna 432 for reception of transmissions over the wireless transmission link 450 at the same time that the downlink transmitter is coupled to the downlink antenna 412. Conversely, the operations of the two transceivers 410 and 430 may be coordinated in time such that the downlink receiver is coupled to the downlink antenna 412 for reception of transmissions over the wireless transmission link 450 at the same time that the uplink transmitter is coupled to the uplink antenna 432. In some embodiments, there is close time synchronization with a minimal guard time between changes in duplex direction.

The UE transceiver 430 and the base station transceiver 410 are configured to communicate via the wireless data communication link 450, and cooperate with a suitably configured RF antenna arrangement 412/432 that can support a particular wireless communication protocol and modulation scheme. In some illustrative embodiments, the UE transceiver 410 and the base station transceiver 410 are configured to support industry standards such as the Long Term Evolution (LTE) and emerging 5G standards, and the like. It is understood, however, that the present disclosure is not necessarily limited in application to a particular standard and associated protocols. Rather, the UE transceiver 430 and the base station transceiver 410 may be configured to support alternate, or additional, wireless data communication protocols, including future standards or variations thereof.

In accordance with various embodiments, the BS 402 may be an evolved node B (eNB), a serving eNB, a target eNB, a femto station, or a pico station, for example. In some embodiments, the UE 404 may be embodied in various types of user devices such as a mobile phone, a smart phone, a personal digital assistant (PDA), tablet, laptop computer, wearable computing device, etc. The processor modules 414 and 436 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 414 and 436, respectively, or in any practical combination thereof. The memory modules 416 and 434 may be realized as RAM memory, flash memory, ROM memory, EPROM memory, EEPROM memory, registers, a hard disk, a removable disk, a CD-ROM, or any other form of storage medium known in the art. In this regard, memory modules 416 and 434 may be coupled to the processor modules 410 and 430, respectively, such that the processors modules 410 and 430 can read information from, and write information to, memory modules 416 and 434, respectively. The memory modules 416 and 434 may also be integrated into their respective processor modules 410 and 430. In some embodiments, the memory modules 416 and 434 may each include a cache memory for storing temporary variables or other intermediate information during execution of instructions to be executed by processor modules 410 and 430, respectively. Memory modules 416 and 434 may also each include non-volatile memory for storing instructions to be executed by the processor modules 410 and 430, respectively.

The network communication module 418 generally represents the hardware, software, firmware, processing logic, and/or other components of the base station 402 that enable bi-directional communication between base station transceiver 410 and other network components and communication nodes configured to communication with the base station 402. For example, network communication module 418 may be configured to support internet or WiMAX traffic. In a typical deployment, without limitation, network communication module 418 provides an 802.3 Ethernet interface such that base station transceiver 410 can communicate with a conventional Ethernet based computer network. In this manner, the network communication module 418 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Power Headroom Reporting

Power Headroom Reporting is a procedure to report the UL transmission power head room to a network (NW). The power headroom reporting in this disclosure can include but not limited to the PHR defined in the current specification (e.g., NR specification or LTE specification).

In a first instance (referred to herein as, "Case A"), the UE 304 and/or the BS 302 may, in some embodiments, determine whether a power headroom reporting (PHR) procedure is triggered based on detecting a condition for PHR.

In a second instance (referred to herein as, "Case B"), the UE 304 and/or the BS 302 may, in some embodiments, determine which PHR format (sometimes referred to as, "PHR MAC CE format") may be used for a transmission and/or reporting a PHR. In some embodiments, a PHR format may be a single entry PHR MAC CE or a multiple entry PHR MAC CE. In some embodiments, the single entry PHR MAC CE may include at least one of the following: 1) power headroom information, 2) the value of maximum UL transmission power, and 3) a serving cell identifier or a serving cell bit map. In some embodiments, the multiple entry PHR MAC CE may include at least one of the following: 1) power headroom information, 2) the value of maximum UL transmission power, and 3) a serving cell identifier or a serving cell bitmap.

In a third instance (referred to herein as, "Case C"), the UE 304 and/or the BS 302 may, in some embodiments, determine whether to obtain the maximum value of UL transmission power from a physical layer (PHY) for the PHR information in the PHR.

In a fourth instance (referred to herein as, "Case D"), the UE 304 and/or the BS 302 may, in some embodiments, determine how to fill the PH information for target cell(s) or/and source cell(s).

In a fifth instance (referred to herein as, "Case E"), the UE 304 and/or the BS 302 may, in some embodiments, determine a mapping index/table from a PH table based on a value.

In a sixth instance (referred to herein as, "Case E"), the UE 304 and/or the BS 302 may, in some embodiments, terminate (e.g., stop, discontinue, suspend, etc.) a PHR procedure.

2.1 Triggering Conditions for PHR ("Case A")

During a DAPS handover, the UE 304 and/or the BS 302 may, in some embodiments, determine whether a power headroom reporting (PHR) procedure is triggered based on detecting a condition for PHR. In some embodiments, a condition may include at least one of 1) a successful termination of RACH procedure in the target cell for DAPS HO; 2) the triggering, activation, and/or configuration of DAPS handover; 3) the addition of target secondary cell (SCell) and/or target primary cell (PCell); 4) upon a RACH procedure that is initiated in a target cell during the DAPS handover and/or the preamble is transmitted during the DAPS handover; 5) a change in the path loss that is more than a pre-configured value for at least one activated serving cell of any MAC entity (i.e., a source MAC entity and a target MAC entity) which is used as a path loss reference since the last transmission of a PHR in this MAC entity when the MAC entity has UL resources for a new transmission; and 6) a periodic timer for reporting PH is expired.

2.2 Determining a PHR Format for PHR ("Case B")

Since the handover command may be inherited from the handover request acknowledgement message and generated by a source node (sometimes referred to as, "source cell"), the information element (sometimes referred to as, "multiplePHR") may, in some embodiments, be included in a handover command, which is used to indicate the PHR format (i.e., multiple PHR MAC CE format or single PHR MAC CE format) used when sending to target cell(s).

The UE 304 and/or the BS 302 may, in some embodiments, determine which PHR format (sometimes referred to as, "PHR MAC CE format") to use for a transmission and/or reporting a PHR to the source node (sometimes referred to as, "source cell") based on the information element (sometimes referred to as, "multiplePHR") received in a handover command (e.g., from the source node). In some embodiments. The BS 302 may send a handover command to the UE 304 that is including an information element (sometimes referred to as, "multiplePHR").

The UE 304 and/or the BS 302 may, in some embodiments, determine which PHR format to use for a transmission and/or reporting a PHR to the source node (sometimes referred to as, "source cell") based on the configuration of the DAPS handover. For example, once the DAPS is configured to at least one data radio bearer (DRB), then the UE 304 may define (e.g., introduce, create, generate, etc.) a new behavior for DAPS. In some embodiments, the wireless communication device may report the multiple entry MAC CE to a target node if at least one DRB is configured with DAPS. In some embodiments, the wireless communication device may report the multiple entry MAC CE to a source node if at least one DRB is configured with DAPS.

The UE 304 and/or the BS 302 may, in some embodiments, determine which PHR format to use for a transmission and/or reporting a PHR to the source node (sometimes referred to as, "source cell") based on a capability of the UE 304 for dynamic power sharing. In some embodiments, the capability of dynamic sharing is that two or more MAC entities is able to be incorporated (e.g., generated, created, executed, etc.) for controlling the respective transmission power by following one or more criterion in the case that simultaneous UL transmission are performed. In some embodiments, if a wireless communication device supports the capability of dynamic power sharing, then the wireless communication device may determine (e.g., identify) a multiple entry PHR MAC CE to select for sending to target cell or/and source cell.

The UE 304 and/or the BS 302 may, in some embodiments, determine which PHR format to use for a transmission and/or reporting a PHR to the source node (sometimes referred to as, "source cell") based on any combination of the embodiments described herein.

The UE 304 and/or the BS 302 may, in some embodiments, introduce (e.g., define, generate, create, etc.) a new information element (IE) to indicate the PHR format used during the DAPS handover for the source node. The BS 302 may, in some embodiments, send a RRC signaling to the UE 304 which includes this information element.

The UE 304 and/or the BS 302 may, in some embodiments, reuse the multiplePHR configured in the RRC configuration of a source MAC entity for indicating the PHR format used during DAPS for the source node. The BS 302 may, in some embodiments, send a RRC signaling to the UE 304 which includes the multiplePHR information.

2.3 Determining Whether to Derive the Maximum Value of UL Transmission Power for PHR Information ("Case C")

While a handover command may be inherited from the handover request acknowledgement message and/or generated by a source node, the configuration may be needed in both a source MAC entity and a target MAC entity.

In some embodiments, if the handover command includes an information element indicating a PHR mode (e.g., phr-ModeOtherCG), then the UE 304 and/or the BS 302 may, in some embodiments, determine the value type based on the phr-ModeOtherCG. If a multiple PHR MAC CE is triggered and there is an available PUSCH resources on target cells that can accommodate the multiple PHR MAC CE plus its subheader and if the phr-ModeotherCG is set to real in the case there is an UL transmission on a source cell, then the target MAC entity may, in some embodiments, obtain the value of maximum UL power from physical layer for the serving cell. In some embodiments, the BS 302 may send a handover command which includes the information element indicating a PHR mode (e.g., phr-ModeOtherCG).

In the instance where the RRC configuration includes an information element (e.g., phr-ModeotherCG) that is used for a source MAC entity, the UE 304 and/or the BS 302 may, in some embodiments, determine the value type based on the phr-ModeotherCG. In the instance where a multiple PHR MAC CE is triggered and there is at least one available PUSCH resource on the source cells that can accommodate the multiple PHR MAC CE plus its subheader and if the phr-ModeotherCG is set to real, in the case there is an UL transmission on a target cell, then the source MAC entity may, in some embodiments, obtain the value of maximum UL transmission power from physical layer for the target cell. In some embodiment, the BS 302 may send a RRC signaling which includes the information element indicating a PHR mode (e.g., phr-ModeOtherCG).

The UE 304 and/or the BS 302 may, in some embodiments, receive from a wireless communication node (e.g., BS 302) an information element indicating a PHR mode associated with a source cell in a multiple entry MAC CE. In the instance where a multiple PHR MAC CE is triggered and there is an available PUSCH resources on target cells that can accommodate the multiple PHR MAC CE and if the phr-ModeotherCG is set to real in the case there is an UL transmission on a source cell, then the target MAC entity may, in some embodiments, obtain the value of maximum UL power from physical layer for the source cell.

The UE 304 and/or the BS 302 may, in some embodiments, determine that a multiple entry MAC CE is triggered during DAPS handover. In some embodiments, if there is an available PUSCH resource on the target cells that can accommodate the multiple PHR MAC CE and there is an UL transmission on a source cell, then the target MAC entity may, in some embodiments, obtain the value of maximum UL power from physical layer for the source cell.

The UE 304 and/or the BS 302 may, in some embodiments, determine a multiple entry MAC CE is triggered during DAPS handover. In the instance where there is an available PUSCH resource on the source cells that can accommodate the multiple PHR MAC CE and there is an UL transmission on a target cell, then the source MAC entity may, in some embodiments, obtain the value of maximum UL power from physical layer for the target cell.

Figure 5A:
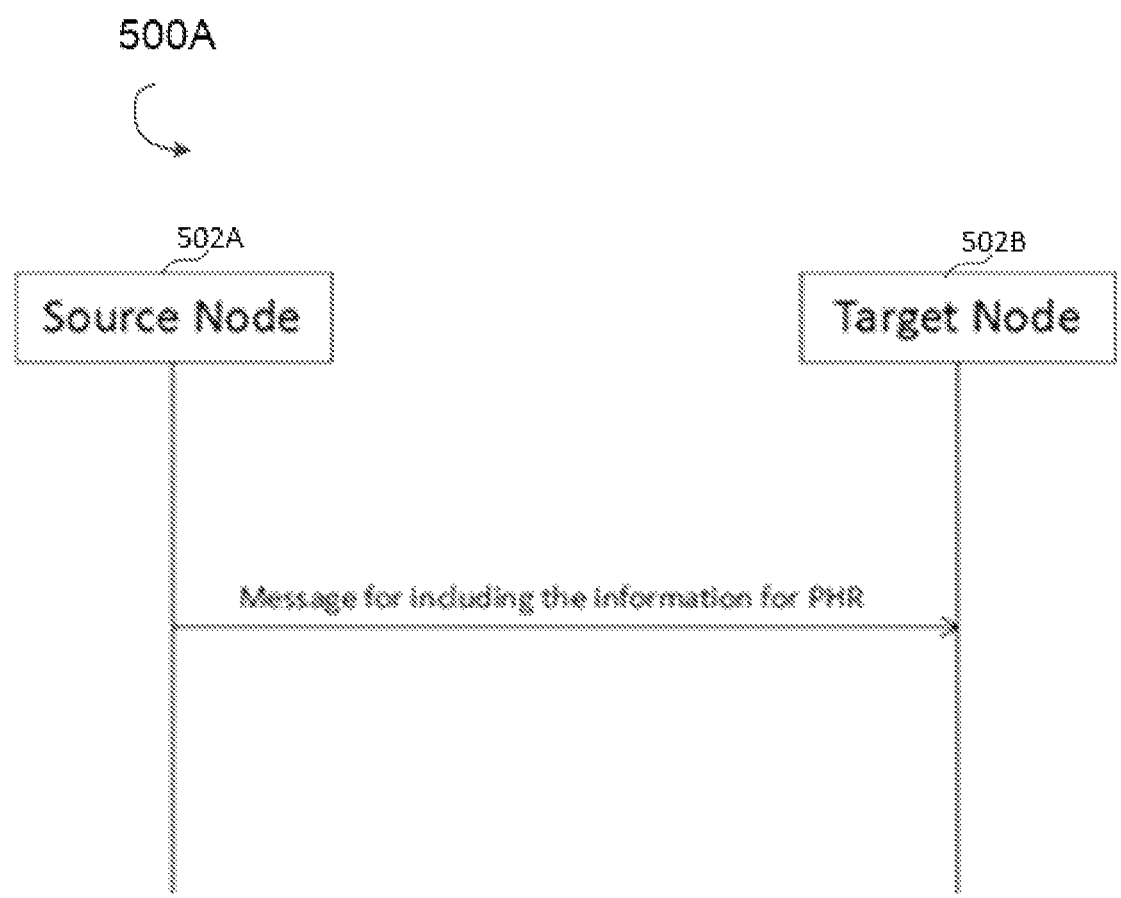
FIG. 5A illustrates a block diagram of an example environment for power headroom reporting, in accordance with some embodiments of the present disclosure.

FIG. 5A illustrates a block diagram of an example environment for power headroom reporting, in accordance with some embodiments of the present disclosure. The example environment 500A includes a source node 502A (sometimes referred to as, "wireless communication node"), and/or a target node 504A (sometimes referred to as, "wireless communication node"). In some embodiments, the source node 502A may be a "first" wireless communication node having identical or similar functionality as the BS 302 in FIG. 3 and the target node 504A may be a "second" wireless communication node having identical or similar functionality as the BS 302 in FIG. 3.

In some embodiments, the source node determines the power headroom information type (i.e., virtual or real) and/or the PHR MAC CE format (i.e., multiple entry MAC CE or single entry MAC CE). In some embodiments, the source node notifies to a target node via an X2/Xn interface, the determined power headroom information type and/or the PHR MAC CE format. In some embodiments, the power headroom type indicates the PHR information type for source node or/and target node. In some embodiments, the PHR MAC CE format indicates that the format is used for target node or/and source node. In some embodiments, the X2/Xn interface is an interface between two nodes.

Figure 5B:
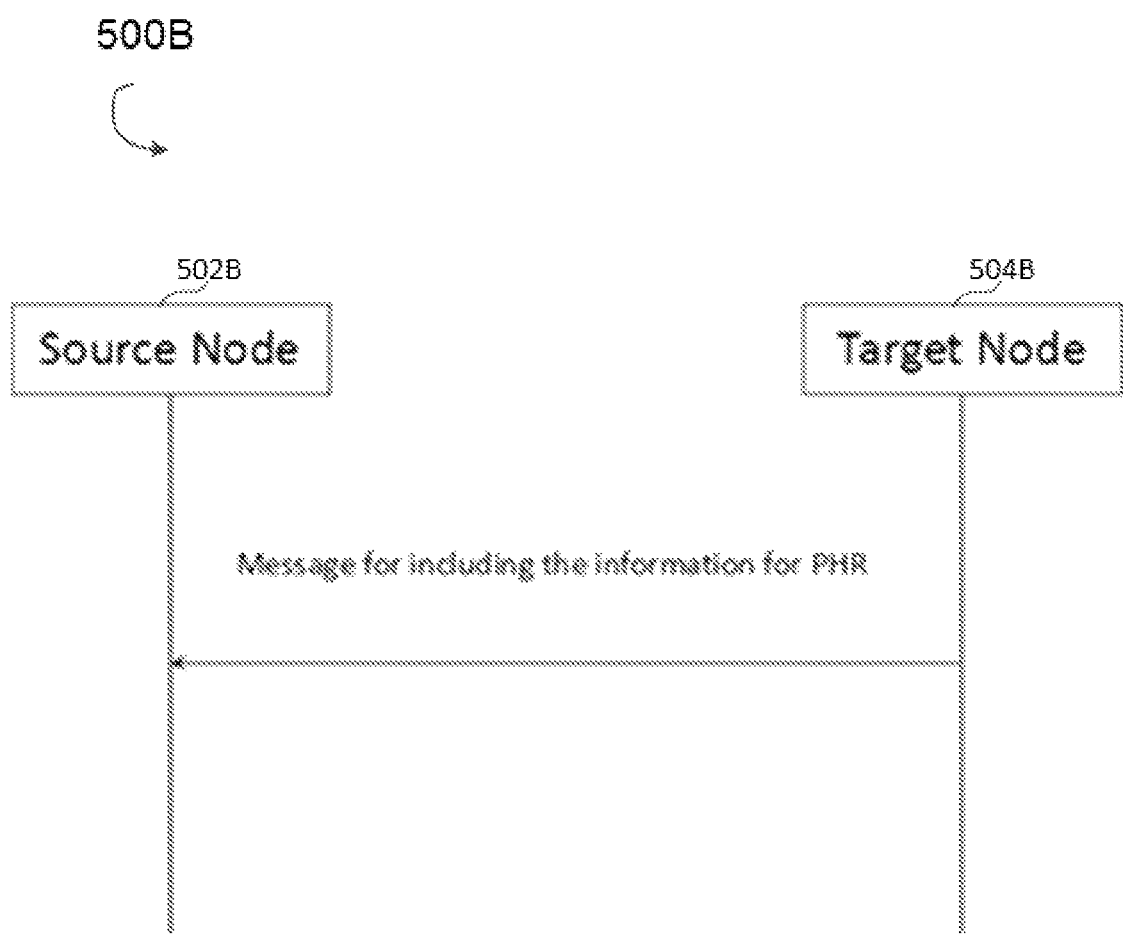
FIG. 5B illustrates a block diagram of an example environment for power headroom reporting, in accordance with some embodiments of the present disclosure.

FIG. 5B illustrates a block diagram of an example environment for power headroom reporting, in accordance with some embodiments of the present disclosure. The example environment 500B includes a source node 502B (sometimes referred to as, "wireless communication node"), and/or a target node 504B (sometimes referred to as, "wireless communication node"). In some embodiments, the source node 502B may be a "first" wireless communication node having identical or similar functionality as the BS 302 in FIG. 3 and the target node 504B may be a "second" wireless communication node having identical or similar functionality as the BS 302 in FIG. 3.

In some embodiments, a target node determines the power headroom information type (i.e., virtual or real) and/or the PHR MAC CE format (i.e., multiple entry MAC CE or single entry MAC CE). In some embodiments, the target node notifies to a source node via X2/Xn interface, by the determined power headroom information type and/or the PHR MAC CE format. In some embodiments, the power headroom type indicates the PHR information type for source node or/and target node. In some embodiments, the PHR MAC CE format indicates that the format is used for target node or/and source node. In some embodiments, the X2/Xn interface is an interface between two nodes.

2.4 Determining how to Fill PH Information into a PHR MAC CE ("Case D")

In conventional 5G systems, the PHR MAC CE can be triggered and sent by any MAC entities, where the format of PHR MAC CE is selected based on the configuration of the MAC entity who is responsible for this MAC CE transmission. In the case that the configuration of this MAC is configured with a multiplePHR, a multiple entry PHR MAC CE may be used.

However, a DAPS structure may not be similar with the Dual Connectivity (DC) model. In addition, in the conventional 5G system, there is no any indication within a multiple entry multiple PHR MAC CE that can represent the target cell.

Thus, there may be an issue with how to make a multiple entry PHR MAC CE to report the PHR information for a target cell.

The UE 304 and/or the BS 302 may, in some embodiments, determine a value type (e.g., a real value, a virtual value, etc.) for PHR information in a PHR for a source side and/or target side based on a PHR.

Multiple Entry PHR MAC CE

In the instance where a PHR format of the information in the PHR corresponds to a multiple entry PHR medium access control (MAC) control element (CE), the UE 304 and/or the BS 302 may determine how to fill the PH information into the PHR MAC CE for a target cell or/and a source cell based one or more methods.

In a first method (sometimes referred to as, "RRC+MAC CE method"), the UE 304 and/or the BS 302 may allocate (e.g., assign, reserve, distribute, etc.) a virtual serving cell index to a target cell and/or a source cell within the DAPS HO command. A virtual serving cell identifier (ID) for a source cell may, in some embodiments, be needed for sending PHR to a target cell and/or one virtual cell ID for a target cell may be needed for sending to source cell. The virtual serving cell ID may, in some embodiments, be configurable by NW side, and/or specified in a specification (e.g., policy, etc.) with a fixed value. In other words, since only a PCell may, in some embodiments, be supported during DAPS, the UE 304 and/or the BS 302 may specify the SpCell in the other MAC entity to use the virtual serving cell ID.

In a second method (sometimes referred to as, "MAC CE only method"), the UE 304 and/or the BS 302 may redefine (e.g., generate, create, etc.) a bit (e.g., an "r" bit) in a legacy multiple PHR MAC CE to represent (e.g., indicate) the target cell and/or source cell. The UE 304 and/or the BS 302 may, in some embodiments, allocate a different Logical Channel Identifier (LCID) to a multiple entry PHR MAC CE used during DAPS HO procedure with the legacy multiple PHR MAC CE. In some embodiments, the legacy multiple PHR MAC CE is used for reporting PH information in the case that the DAPS HO procedure is not ongoing.

For example, FIG. 5C illustrates a block diagram of an example special multiple PHR MAC CE format during DAPS HO, in accordance with some embodiments of the present disclosure. As another example, FIG. 5D illustrates a block diagram of an example special multiple entry MAC CE format which has a different LCID with the legacy multiple entry MAC CE, in accordance with some embodiments of the present disclosure.

In a third method (sometimes referred to as, "text based method"), each MAC entity in the UE 304 and/or the BS 302 may, in some embodiments, generate a multiple entry PHR MAC CE that includes the PH information of activated serving cells that are associated with the same MAC entity correspondingly.

Single Entry PHR MAC CE

In the instance where a PHR format of the information in the PHR corresponds to a single entry PHR medium access control (MAC) control element (CE), the UE 304 and/or the BS 302 may determine how to fill the PH information into the PHR MAC CE for a target cell or/and a source cell based one or more methods.

In a first method, a MAC entity of the UE 304 and/or the BS 302 that generates the single PHR MAC CE may report the PH information of the primary cell of this MAC entity In a second method, a MAC entity of the UE 304 and/or the BS 302 that generates the single PHR MAC CE may report the PH information of the target cell.

In a second method, a MAC entity of the UE 304 and/or the BS 302 that generates the single PHR MAC CE may report the PH information of the source cell.

2.5 Determining a Mapping Index/Table ("Case E")

The UE 304 and/or the BS 302 may, in some embodiments, determine a mapping index/table from a PH table based on a value. In some embodiments, the rules (e.g., specification, standards, policies, etc.) used by conventional 5G systems may be used. In some embodiments, a source node and/or a target node may derive (e.g., generate, create, define, etc.) the mapping index/table of a PHR value based on a frequency of a target cell and/or a source cell.

2.6 Terminating a PHR Procedure ("Case F")

Regarding the "text based method" described above, the UE 304 and/or the BS 302 may terminate the PHR procedure based on one or more methods.

In a first method, if a MAC entity generate a PHR MAC CE, then the UE 304 and/or the BS 302 may, in some embodiments, cancel (e.g., terminate, suspend, discontinue, etc.) all PHRs that are triggered by the MAC entity.

In a second method, if a MAC entity generates a PHR MAC CE, then the UE 304 and/or the BS 302 may, in some embodiments, cancel the all PHRs that are triggered by any of the MAC entities.

In a third method, if the PHR information of all activated serving cells are reported by each MAC entity, then the US 304 and/or the BS 302 may, in some embodiments, cancel all the PHRs that are triggered by any of the MAC entities.

2.7. Methods for Implementing Example Embodiment(s) of Cases A-F

Figure 6:
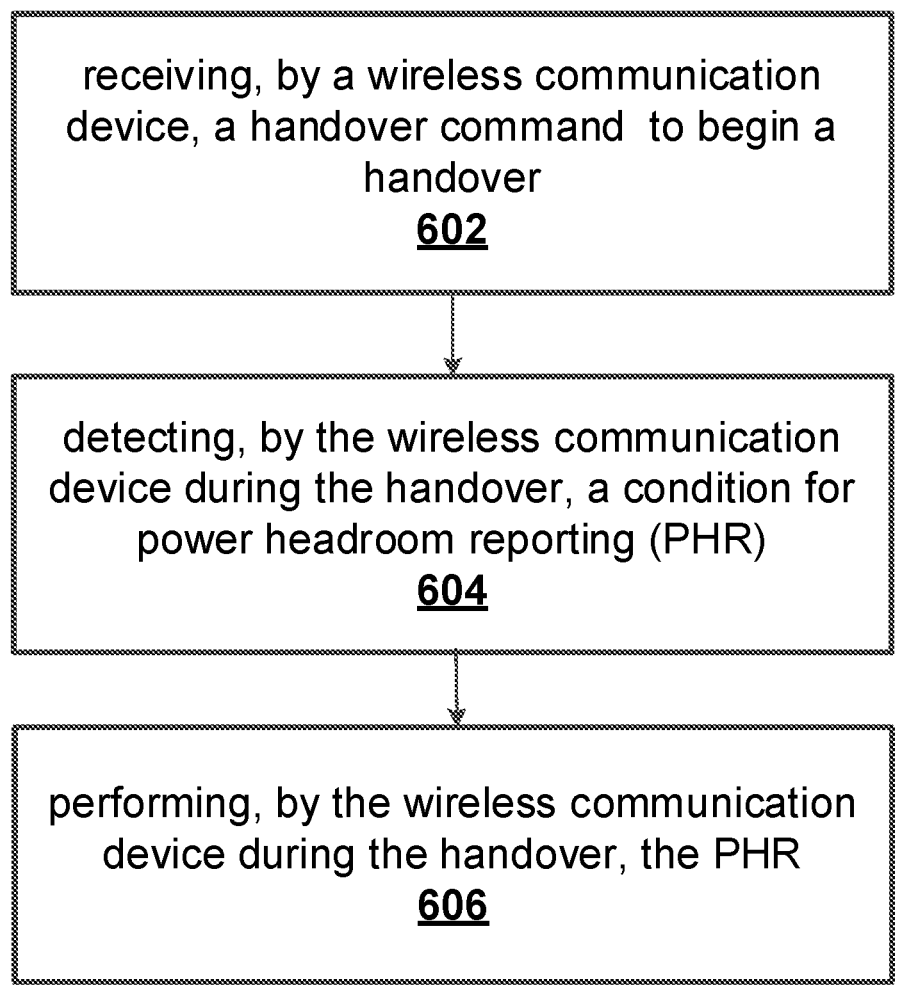
FIG. 6 is a flow diagram depicting a method for power headroom reporting during a DAPS handover procedure, in accordance with some embodiments of the present disclosure.

FIG. 6 is a flow diagram depicting a method for power headroom reporting during a DAPS handover procedure, in accordance with some embodiments of the present disclosure. Additional, fewer, or different operations may be performed in the method depending on the particular embodiment. In some embodiments, some or all operations of method 600 may be performed by a wireless communication node, such as BS 302 in FIG. 3. In some operations, some or all operations of method 600 may be performed by a wireless communication device, such as UE 304 in FIG. 3. Each operation may be re-ordered, added, removed, or repeated.

As shown, the method 600 includes, in some embodiments, the operation 602 of receiving, by a wireless communication device (e.g., UE 304 in FIG. 3), a handover command to begin a dual activity protocol structure (DAPS) handover. The method includes, in some embodiments, the operation of 604 of detecting, by the wireless communication device during the DAPS handover, a condition for power headroom reporting (PHR). The method includes, in some embodiments, the operation of 606 of performing, by the wireless communication device during the DAPS handover, the PHR.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
   receiving, by a wireless communication device, a handover command to begin a handover from a source cell associated with a first base station, to a target cell associated with a second base station different from the first base station;
   detecting, by the wireless communication device during the handover, a condition for power headroom reporting (PHR);
   determining, by the wireless communication device, a PHR format for the PHR according to the handover command, wherein the PHR format is a special multiple entry PHR MAC CE format, wherein the special multiple entry PHR MAC CE format comprises a logical channel identifier (LCID) different from an LCID used for a regular multiple entry PHR MAC CE format; and
   performing, by the wireless communication device during the handover, the PHR for the target cell of the handover.

2. The method of claim 1, further comprising:
   determining, by the wireless communication devices, a multiple entry PHR MAC CE format for reporting the PHR; and
   determining, by the wireless communication device, a procedure for reporting PHR information of the target cell and the source cell in a multiple PHR MAC CE during the handover.

3. The method of claim 2, further comprising:
receiving, by the wireless communication device, a radio resource control (RRC) signaling including a virtual serving cell identifier (ID) for the target cell; and
determining, by the wireless communication device, to report the PHR information of the target cell associated with the virtual serving cell ID.

4. The method of claim 2, further comprising:
receiving, by the wireless communication device, a radio resource control (RRC) signaling including a virtual serving cell identifier (ID) for the source cell; and
determining, by the wireless communication device, to report the PHR information of the source cell associated with the virtual serving cell ID.

5. The method of claim 2, wherein a fixed virtual serving cell ID is allocated to the target cell or to the source cell during the handover and according to a policy.

6. The method of claim 2, further comprising:
generating, by each MAC entity of the wireless communication device, a respective multiple entry PHR MAC CE comprising power headroom information of an activated serving cell in a PHR that belongs to the respective MAC entity.

7. The method of claim 6, further comprising at least one of:
determining, by the wireless communication device, that a MAC entity of the wireless communication device generated a multiple entry PHR MAC CE; and
canceling, by the wireless communication device, a PHR that is triggered by the MAC entity;
or
determining, by the wireless communication device, that a MAC entity of the wireless communication device generated a multiple entry PHR MAC CE; and
canceling, by the wireless communication device, all PHRs that are triggered by any MAC entities.

8. The method of claim 1, wherein the special multiple entry PHR MAC CE format further includes virtual serving cell identifiers for the target cell and the source cell.

9. A wireless communication device comprising:
at least one processor configured to:
receive, via a receiver, a handover command to begin a handover from a source cell associated with a first base station, to a target cell associated with a second base station different from the first base station;
detect, during the handover, a condition for power headroom reporting (PHR);
determine a PHR format for the PHR according to the handover command, wherein the PHR format is a special multiple entry PHR MAC CE format, wherein the special multiple entry PHR MAC CE format comprises a logical channel identifier (LCID) different from an LCID used for a regular multiple entry PHR MAC CE format; and
perform, during the handover, the PHR for the target cell of the handover.

10. The wireless communication device of claim 9, wherein the at least one processor is configured to:
determine a multiple entry PHR MAC CE format for reporting the PHR; and
determine a procedure for reporting PHR information of the target cell and the source cell in a multiple PHR MAC CE during the handover.

11. The wireless communication device of claim 10, wherein the at least one processor is configured to:
receive, via a receiver, a radio resource control (RRC) signaling including a virtual serving cell identifier (ID) for the target cell; and
determine to report the PHR information of the target cell associated with the virtual serving cell ID.

12. The wireless communication device of claim 10, wherein the at least one processor is configured to:
receive, via a receiver, a radio resource control (RRC) signaling including a virtual serving cell identifier (ID) for the source cell; and
determine to report the PHR information of the source cell associated with the virtual serving cell ID.

13. The wireless communication device of claim 10, wherein a fixed virtual serving cell ID is allocated to the target cell or to the source cell during the handover and according to a policy.

14. The wireless communication device of claim 10, further comprising:
a MAC entity configured to generate a multiple entry PHR MAC CE comprising power headroom information of an activated serving cell in a PHR that belongs to the MAC entity.

15. The wireless communication device of claim 14, wherein the at least one processor is configured to at least one of:
determine that a MAC entity of the wireless communication device generated a multiple entry PHR MAC CE; and
cancel a PHR that is triggered by the MAC entity;
or
determine that a MAC entity of the wireless communication device generated a multiple entry PHR MAC CE; and
cancel all PHRs that are triggered by any MAC entities.

16. The wireless communication device of claim 9, wherein the special multiple entry PHR MAC CE format further includes virtual serving cell identifiers for the target cell and the source cell.

* * * * *